(12) United States Patent
Dewaele (10) Patent No.: US 7,616,818 B2
(45) Date of Patent: Nov. 10, 2009

(54) METHOD OF DETERMINING THE ORIENTATION OF AN IMAGE

(75) Inventor: Piet Dewaele, Berchem (BE)

(73) Assignee: Agfa Healthcare, Mortsel (BE)

( * ) Notice: Subject to any disclaimer, the term of this patent is extended or adjusted under 35 U.S.C. 154(b) by 419 days.

(21) Appl. No.: 10/776,736

(22) Filed: Feb. 10, 2004

(65) Prior Publication Data
US 2004/0161141 A1    Aug. 19, 2004

Related U.S. Application Data

(60) Provisional application No. 60/477,205, filed on Jun. 10, 2003.

(30) Foreign Application Priority Data

Feb. 19, 2003   (EP)   ................................. 03100375

(51) Int. Cl.
*G06K 9/48* (2006.01)
*G06K 9/36* (2006.01)
(52) U.S. Cl. .................. 382/199; 382/289; 702/150
(58) Field of Classification Search ................ 382/199, 382/289; 702/150
See application file for complete search history.

(56) References Cited

U.S. PATENT DOCUMENTS

| | | | | | |
|---|---|---|---|---|---|
| 5,572,565 | A | * | 11/1996 | Abdel-Mottaleb | 378/37 |
| 5,579,360 | A | * | 11/1996 | Abdel-Mottaleb | 378/37 |
| 5,943,446 | A | * | 8/1999 | Pulsipher et al. | 382/253 |
| 5,970,182 | A | * | 10/1999 | Goris | 382/278 |
| 6,055,326 | A | * | 4/2000 | Chang et al. | 382/132 |
| 6,246,784 | B1 | * | 6/2001 | Summers et al. | 382/128 |
| 6,501,848 | B1 | * | 12/2002 | Carroll et al. | 382/128 |
| 7,092,550 | B2 | * | 8/2006 | Xu | 382/107 |
| 2002/0164060 | A1 | * | 11/2002 | Paik et al. | 382/128 |
| 2003/0215119 | A1 | * | 11/2003 | Uppaluri et al. | 382/128 |
| 2003/0215120 | A1 | * | 11/2003 | Uppaluri et al. | 382/128 |

FOREIGN PATENT DOCUMENTS

WO    WO 02/45437 A2    6/2002

OTHER PUBLICATIONS

Chang et al., "Radiology Image Orientation Processing for Workstation Display", Feb. 1998, SPIE Conference on Image Display, vol. 3335, 285-296.*
Kawata et al., "Characteristics Measurement for Blood Vessels Diseases Detection Based on Cone-Beam CT Images", Oct. 1995, Nuclear Science Symposium and Medical Imaging Conference Record, 1660-1664.*
Pietka, Ewa, "Image Standardization in PACS", 2000, Academic Press, Chapter 48, 783-801.*

(Continued)

*Primary Examiner*—Bhavesh M Mehta
*Assistant Examiner*—Katrina Fujita
(74) *Attorney, Agent, or Firm*—Leydig, Voit & Mayer, Ltd.

(57)    ABSTRACT

The orientation of an image such as a radiographic image is deduced from the digital representation of the image.

In one embodiment the curvature is calculated and a decision on the orientation of the image is obtained on the basis of the value of the calculated curvature.

12 Claims, 4 Drawing Sheets

OTHER PUBLICATIONS

Sander et al., "Inferring Surface Trace and Differential Structure from 3-D Images", Sep. 1990, IEEE Transactions on Pattern Analysis and Machine Intelligence, vol. 12, No. 9, 833-854.*

Glicksman et al., "Architecture of a High Performance PACS Based on a Shared File System", 1992, Proceedings of SPIE, vol. 1654, Medical Imaging VI: PACS Design and Evaluation, 158-168.*

Wuescher et al., "Robust Contour Decomposition Using a Constant Curvature Criterion", Jan. 1991, IEEE Trans. on Pattern Analysis and Machine Intelligence, vol. 13, No. 1, 41-51.*

Wahle et al., "Geometrically Correct 3-D Reconstruction of Intravascular Ultrasound Images by Fusion with Biplane Angiography—Methods and Validation", Aug. 1999, IEEE, 686-699.*

Desai et al., *Pattern Recognition*, vol. 2, *Conference B: Computer Vision & Image Processing, Proceedings of the 12$^{th}$ IAPR Int'l Conference in* Jerusalem, 168-172 (Oct. 9-13, 1994).

Bankman et al., *Handbook of Medical Imaging*, Ch. 14, 215-230, Academic Press (2000).

Pietka, *Handbook of Medical Imaging*, Ch. 48, 783-801, Academic Press (2000).

Search Report for EP 03 10 0375 (Jul. 25, 2003).

* cited by examiner

METHOD OF DETERMINING THE ORIENTATION OF AN IMAGE

This application claims the benefit of and priority to U.S. Provisional Patent Application No. 60/477,205 filed Jun. 10, 2003, and to European Patent Application No. 03100375.9 filed Feb. 19, 2003, both of which are incorporated by reference.

FIELD OF THE INVENTION

The present invention relates to a method for detecting the orientation of object shapes in radiographic images.

BACKGROUND OF THE INVENTION

In radiological practice, it is common to display different exposures pertaining to a patient study in a predefined format. This feature is known as a hanging protocol. In film-based operation, it means that the radiologist or operator hangs the films on the light box in a specific spatial arrangement according to standard or local preferences. Determination of the orientation or reflection of an examination type, or verification of it when it is available, is beneficial to the correct display of many examination types.

For example, thorax examinations are always hung in such a way as to display the ribcage in the upstanding direction and showing the heart shadow at the right side with respect to the centerline. However, for reasons of exposure and read-out geometry, 90-degree orientation changes may occur in digitally acquired images.

In particular for chest images acquired with a computed radiography modality, guaranteeing a correct orientation is a major problem, because the cassette may be wrongly oriented at exposure time due to patient conditions and clinical requirements. Orientations different from the standard upright orientation are reported to be as high as 40%. Especially in high throughput hospital departments, radiologist and clinicians perceive the task of rotating the image to the standard orientation as a cumbersome task and a waste of time. Moreover, when automatic diagnostic data processing has to be performed on the digital image, a standard orientation must be available for correct operation of the CAD (computer-aided diagnosis) algorithms or subsequent operations such as annotations, measurements and archiving.

A similar problem exists in screening mammography, where standard 4-views of left and right breast are taken for each of the incidence directions (cranio-caudal (CC) and medio-lateral oblique (MLO)). These views are typically displayed in a mirrored fashion, such that the thorax edges or both breasts are central and touching, and the left breast image being displayed on the right and the right breast image being displayed on the left. However, because both breast images are acquired in a similar manner, and it is in general not known which image is either corresponding to the left or the right breast, one image must be flipped before it can be positioned adjacent to the other image. In conventional screen-film imaging, X-ray opaque lead letters are radiographed simultaneously (RCC, LCC, RMLO and LMLO), and the RCC resp. RMLO films are flipped manually prior to hanging them on the right of the LCC resp. LMLO on the light box.

Digitally acquired mammograms may still be read in a conventional way by printing them on film and displaying them on a light box. Pairs of mammograms (e.g. the RCC/LCC pair and the RMLO/LMLO pair) may be printed on a single large film sheet or on two smaller sized sheets. Generally, the print margin of a hardcopy machine is adjustable, so as to minimize the non-printed portion of an image. For mammography hardcopy, the print margin corresponding to the thorax side is kept as small as possible, so that a right-left pair of images, when viewed simultaneous and in close vicinity, shows a minimal non-diagnostic viewing area in between both images. Therefore, when using a pair of small sheets to print left and right images respectively, means to identify the thorax side automatically prior to printing them is needed, because the thorax side position is generally not known or it may not be assumed to be known. Likewise, in the large film option, where both images are printed on one file sheet in order to compose the image such that the right image is touching in a mirroring manner to the left image, knowledge of the thorax side of both images is needed as well.

Digital mammography may be read on a computer display or viewing station without having resort to printed mammograms, a viewing condition known as softcopy reading. However, also here, the sub-examination types identifying right and left images may not be known at display time. Furthermore, the thorax edge orientation may not be standardized, e.g. it may either touch the left or right or the upper or lower image border. Hence, there is a need to accomplish the mirrored viewing disposition in an automated way.

Generally, a hanging protocol function enables users to arrange and display images on medical viewing stations to suit specific viewing preferences. To this purpose, the sub-examination is used to assign the sub-images pertaining to a patient study of a body part to a position in a preferred display layout of that examination type. When the image sub-type is known, hence its position in the layout is determined, the image can still by oriented in 8 different ways: it can be oriented correctly, or it can be rotated of 90, 180 or 270 degrees; in any of these four cases, the image can also be flipped around a vertical (or horizontal axis). Therefore, there is a need to derive the orientation of the image automatically, to assure viewing according to the radiological standard or local preferences.

The problem of orientation detection and occasional correction therefore consists in detecting the orientation as one of 0, 90, 180 or 270 degrees with respect to an image coordinate axis. When the orientation equals 0 degrees, no orientation correction needs to be performed, otherwise the image must be anti-rotated to have it in the upright direction (head-neck region on top of the corrected image).

The orientation detection solution must further be insensitive to a number of disturbing image characteristics such as
   the presence of collimation borders
   rotation of the centerline of the thorax with respect to the vertical axis
   the presence of other non-thorax regions, such as head/neck, sub-diaphragm region and abdomen region
   unilateral hyper-dense appearance of a diseased lung region

SUMMARY OF THE INVENTION

The above-mentioned objects are realised by a method as set out in claim 1.

Further embodiments are set out in the dependent claims.

The method is particularly useful for orienting and standardizing chest radiographs in upright position.

The method of the current invention is particularly useful in the field of digital mammography, to detect the thorax to nipple direction and align a left-right pair of breast views such that their thorax sides are touching when printed on film or displayed on screen.

In the field of general radiology, the invention is particularly useful to determine the orientation of curved shaped objects, such as determination of the orientation of a frontal or lateral exposure of the skull in 2D or 3D cerebral examination (MR, CT).

The embodiments of the methods of the present invention are generally implemented in the form of a computer program product adapted to carry out the method steps of the present invention when run on a computer. The computer program product is commonly stored in a computer readable carrier medium such as a CD-ROM.

Alternatively the computer program product takes the form of an electric signal and can be communicated to a user through electronic communication.

DETAILED DESCRIPTION

Figure 1:
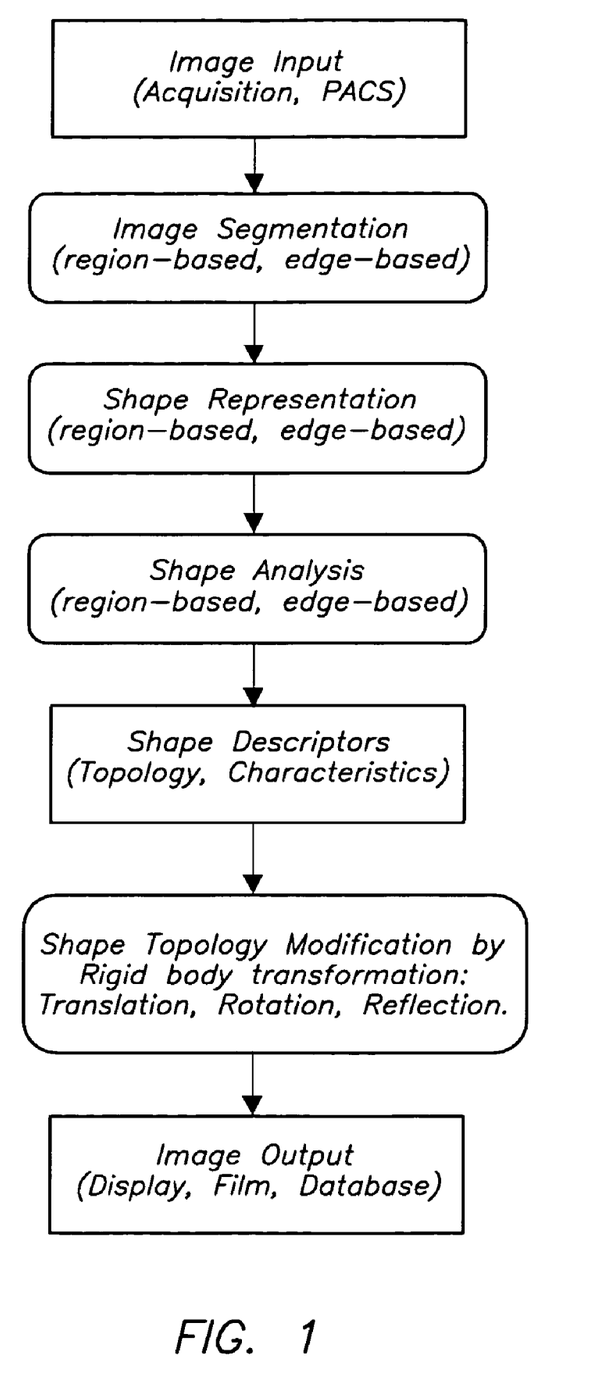
FIG. 1 shows a general overview of the method according to the present invention.

A general overview of the system to manipulate a radiation image according to the shape of objects in the diagnostic region(s) of the image is given in FIG. 1.

In order to conduct a topological analysis of a radiographic image to infer the position of the breast thorax side and the nipple-thorax direction, shape analysis is performed.

Shape analysis can be carried out starting from an intermediate representation typically involving the segmented image and/or special shape descriptors.

A radiation image typically consist of three different areas:

The diagnostic area comprises pixels corresponding to patient anatomy. In general, the outline of this imaged area may take any shape.

The direct exposure area is the image region that has received unattenuated radiation. Although this region has constant intensity corrupted by noise only, inhomogenities in incident energy (e.g. X-ray source Heel effect) and receptor (e.g. varying storage phosphor sensitivity in computed radiography) may distort this pattern. In European patent application EP 1 256 907 a method is disclosed to estimate these global inhomogenities retrospectively from the diagnostic image and flatten the response in all image parts in accordance with an extrapolated background signal.

The collimated areas appear on the image as highly attenuated pixels. The shape of these areas typically is rectilinear, but circular or curved collimation shapes may be applied as well.

Three different area transition types may be considered in a radiation image: diagnostic/direct exposure, diagnostic/collimated area, and direct exposure/collimated area boundaries.

Segmentation algorithms aim at detecting and separating of the set of pixels that constitute the object(s) under analysis. These techniques may be broadly classified according to the type of processing applied to the image. Region-based algorithms group pixels in the image according to suitable similarity criteria. In European patent application EP 887 769 a region-based algorithm is disclosed to segment direct exposure areas by grouping pixels according to centroid clustering of the gray value histogram. Edge-based algorithms separate image pixels in high contrast regions in the image according to gray value differences of neighboring regions. In European patent application 610 605 and European patent application 742 536 an edge-based algorithm is disclosed to detect and delineate the boundaries between collimated areas and diagnostic areas on a single or multiply exposed image. Either in region-based and edge-based approaches, models may be used to restrict the appearance or shape of the segmented image areas to obey predefined photometric or geometric constraints. An example of this paradigm are the so-called Active Appearance and Active Shape Models (AAM and ASM).

As a consequence of the segmentation result being either a region or a region transition, shape analysis techniques may also be divided roughly in either region-based or edge-based procedures. Shape analysis techniques generally depart from a suitable representation of regions and region boundary, and hence they may also broadly be divided in region-based and contour-based classes. Examples of representations of either type are given in the sequel.

Shape analysis techniques are typically selected in view of the problem requirements. These requirements will broadly fall in one of two classes. The first class may be termed topology problems, in that the problem is one of locating and substantiating the specific spatial arrangement of an object shape with respect to other objects of reference systems. The second class may be termed characterization, and is closely linked with classification. In this problem class, shape specific descriptors must be applied, and in general a topology-independent characterization is needed. Both problem classes are closely linked, because when the topology of a specific shape needs be calculated, the shape must first be searched for and detected on the basis of the shape's specific characteristics. Conversely, when the characteristics of a specific shape need be determined e.g. in order to classify it, the shape must first be located in the image, which problem component is one of topology. Given the topology and characteristics of the shape, the application specific problem can be solved.

The result of a shape analysis is a set of shape descriptors that characterize either the topology, the specific shape features or both.

For the application of aligning a shape to a standard topology, the geometric transformation is determined by the geometric parameters of the shape's topology and the desired topology, and techniques known in the prior art for determining the geometric displacement field and the intensity interpolation are used to geometrically modify the image to the target topology.

In order to determine the orientation of an object in a medical image, e.g. the thorax side of the breast mass, shape analysis techniques are used to describe the topology and characteristics of the object in the image.

The shape of an object determines the extent of the object in the image, which is a binary image, and the spatial distribution of gray levels inside the object's extent. A shape analysis therefore departs from a shape representation, from which shape descriptors are calculated. Shape representation methods result in a non-numeric representation of the original shape capturing the important characteristics of the shape (importance depending on the application). Shape description methods refer to methods that result in a numeric descriptor of the shape, generated by calculating a shape descriptor vector (also called a feature vector). The goal of description is to uniquely characterize the shape using its descriptor vector, independent of the shape's position, orientation and size. Conversely, the process of reduction of a shape to its canonical form that is invariant to translation, rotation and scale, assumes that the actual shape's position, orientation and size are determined.

Curve-Based Shape Orientation Measures

Curve Representation

A curve or contour may in its simplest form be represented by the set of (possibly chained) contour pixels. At a higher level, the curve may be approximated in primitive forms such as a collection of approximating line segments (a polygonal representation, alternatively represented by the corner intersections), circle arcs, elliptical arcs, syntactic primitives, B-splines, Snakes and active contours, or multiscale primitives. Finally, a curve may be represented parametrically, for example as a two-component vector $\gamma(t)=\{x(t),y(t)\}$ for a plane curve, or as a complex signal $u(t)=x(t)+jy(t)$, a chain code or a run-length code.

Edge Gradient Measures

Figure 2:
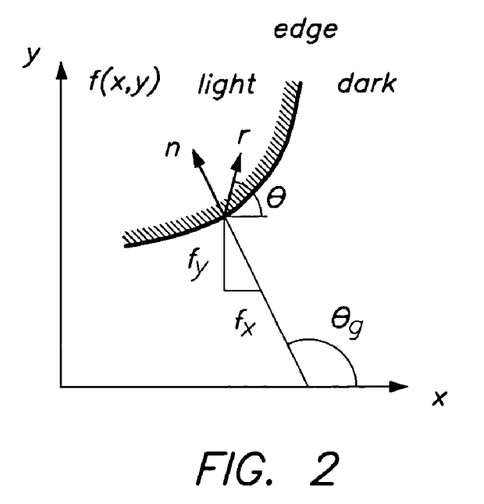
FIG. 2 illustrates the orientation computed by edge gradient.

For a continuous image $f(x,y)$, its derivative assumes a local maximum in the direction of the edge. Therefore, one edge detection technique is to measure the gradient of $f$ along a straight line making an angle $\theta$ w.r.t. the x-axis. If r is a parameter denoting arc length along the line, then the change $\partial f$ when a change $\partial r$ is made along the line is (see FIG. 2)

$$\frac{\partial f}{\partial r} = \frac{\partial f}{\partial x}\frac{\partial x}{\partial r} + \frac{\partial f}{\partial y}\frac{\partial y}{\partial r} = f_x \cos\theta + f_y \sin\theta$$

The maximum value in gradient $\partial f/\partial r$ is obtained by solving $\theta$ from $$\frac{\partial}{\partial \theta}\left(\frac{\partial f}{\partial r}\right) = 0 \Rightarrow -f_x \sin\theta_g + f_y \cos\theta_g = 0 \Rightarrow \theta_g = \arctan\left(\frac{f_y}{f_x}\right),$$

which maximum value is $$g = \left(\frac{\partial f}{\partial r}\right)_{\max} = \sqrt{f_x^2 + f_y^2}$$

$\theta_g(x,y)$ is the edge or gradient orientation, associated with the edge or gradient magnitude $g(x,y)$ at position $(x,y)$.

Based on these concepts of continuous edge gradient, two types of edge detection operators for digital images have been developed. The first are gradient operators, based on calculations of the partial derivatives in x and y direction using finite differences. The Roberts, Prewitt, Sobel and isotropic operators compute horizontal and vertical differences of local sums to reduce the effect of noise. Edge gradient of these operators is lying in the range $[0,2\pi]$. The second are compass operators, that measure gradient in pre-defined directions using templates, and assign the output and the associated direction of the mask giving maximal absolute value response as the gradient magnitude and orientation respectively. Larger masks enable to quantize the orientation to greater precision.

Alternative edge detection techniques such as zero crossing of second derivatives (such as a Laplace operator) may be considered also.

It should be addressed that the orientation computed by edge gradient measures refers to collinear orientation, i.e. if two orientations are collinear (that is, the difference between them is $\pi$, or equivalently, they have opposite edge sense), they should be considered as the same orientation. Therefore, in the absence of a model of the object (that e.g. would pair-wise group and label upper and lower rib edges in a thorax image), which may be used to interpret the local orientation of a pixel and assign that pixel to its object boundary, the domain of the orientation $\theta$ is $[0,\pi]$. For analyzing patterns with constant gradient orientation, this domain may be sufficient. For example, for analyzing the gray value trabecular texture pattern inside tubular bones such as the femur, which has a local preferential direction, or for analyzing the preferential direction of cortical (outer) edges of tubular bones, the edge gradient measure is useful for determining the main orientation.

However, when determining one of the four orientations of a thorax (upside/down, left/right, and reversals), the edge orientation is insufficient when quantized to the domain $[0,\pi]$ to discriminate between the upright and the upside-down direction or the left-to-right and the right-to-left orientations.

Each rib is composed of a pair of (nearly parallel) edges; the orientation of juxtaposed edge pixels on either rib edge thus differs by 180 degrees. Hence, a histogram of quantized edge orientations will show two peaks, each one associated with a dominant edge orientation, and therefore it is impossible to discriminate between flipped or 180 degree rotated image versions.

In the sequel, measures that have a domain of $[0,2\pi]$ are addressed, and that are insensitive to the sense of the edge. It means that, for example, any of a pair of juxtaposed thorax rib edges will yield a similarly oriented analyzing shape feature vector, hence the orientation of the thorax can be discriminated into one of the four main orientations.

The shape features outlined in the sequel are generalized to 3D space curves; the case of contours in the plane of a projection image (such as a radiography) is treated as a special case. Extensions to similar shape features of surfaces in 3D images (such as CT or MR) are also indicated.

Curvature and Torsion Measure

Arc length, curvature and torsion describe local properties of a general curve in 3D, the curvature of so-called principal normal sections describe the local properties of surfaces in 3D. The main tool for such investigations is a local coordinate frame, linked to a point on the curve or surface.

Given an arbitrary parameterization $\gamma(t)=\{x=\phi_1(t), y=\phi_2(t), z=\phi_3(t)\}$, and an associated natural parameterization $\gamma^*(s)=\{x=\phi_1(s), y=\phi_2(s), z=\phi_3(s)\}$ of a space curve with s the arc length parameter, then the expressions for the tangent vector $\vec{t}$, normal vector $\vec{n}$ and binormal vector $\vec{b}$ at a location $\vec{p}_0$ with natural parameter $s_0$ and arbitrary parameter $t_0$ are given by $$\vec{t}_0 = \vec{\gamma}^{*\prime}(s_0) = \frac{\vec{\gamma}'(t_0)}{\|\vec{\gamma}'(t_0)\|}$$

$$\vec{n}_0 = \frac{\vec{\gamma}^{*\prime\prime}(s_0)}{\|\vec{\gamma}^{*\prime\prime}(s_0)\|} = \vec{b}_0 \times \vec{t}_0$$

-continued $$\vec{b}_0 = \vec{t}_0 \times \vec{n}_0 = \frac{\vec{\gamma}^{*\prime}(s_0) \times \vec{\gamma}^{*\prime\prime}(s_0)}{\|\vec{\gamma}^{*\prime\prime}(s_0)\|} = \frac{\vec{\gamma}^{\prime}(t_0) \times \vec{\gamma}^{\prime\prime}(t_0)}{\|\vec{\gamma}^{\prime}(t_0) \times \vec{\gamma}^{\prime\prime}(t_0)\|}$$

Jointly $\vec{t}$, $\vec{n}$ and $\vec{b}$ form a local coordinate system, called the Frenet-Serret frame. Tuples of these vectors define the osculating ($\vec{t}$ and $\vec{n}$), normal ($\vec{n}$ and $\vec{b}$) and rectifying plane ($\vec{t}$ and $\vec{b}$). The orientation of the tangent $\vec{t}_0$ is parallel to the tangent line to the curve through $\vec{p}_0$, and points in the direction defined by the sense in which the curve is traversed, a traversal in reverse sense yielding an opposite direction of the tangent vector.

In the context of image processing, the direction of traversal of a curve may be based on the distribution of gray values across the edge, that is, for example such that the brighter image area is at the right hand side, and the darker image area is on the left side.

Figure 3:
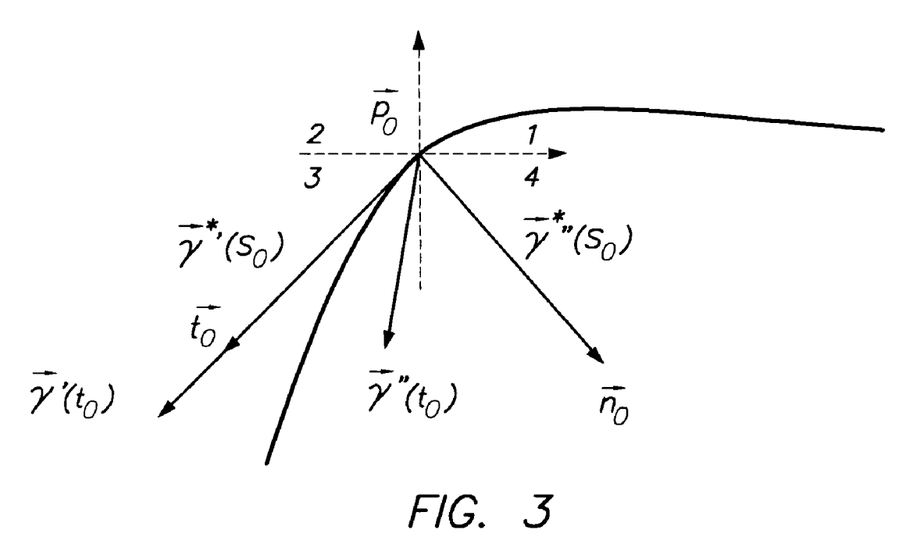
FIG. 3 shows a planar curve, with local first and second derivative. Two coordinate systems are constructed at point $\vec{p}_0$: (1) the Frenet-Serret frame, having axes in the direction of the tangent to the curve, and perpendicular to the tangent direction (towards the center of the osculating circle). (2) a local analyzing coordinate frame, which is aligned with the Cartesian image coordinate axes in this example.

The orientation of the normal $\vec{n}_0$ (also called the main normal) is chosen such that the vector points in the direction where the projection of the curve on the osculating plane is concave. This orientation choice is independent of the traversal direction of the curve. The local Frenet-Serret frame at a point $\vec{p}_0$ of the curve is depicted in FIG. 3 and the following relationships further hold on the depicted vectors:

$$\vec{\gamma}^{*\prime}(s_0) \perp \vec{\gamma}^{*\prime\prime}(s_0)$$

$$\vec{\gamma}^{\prime}(t_0) // \vec{\gamma}^{*\prime}(s_0)$$

$$\|\vec{\gamma}^{*\prime}(s_0)\| = \|\vec{\gamma}^{*\prime\prime}(s_0)\| = 1$$

The change of the vectors $\vec{t}$, $\vec{n}$ and $\vec{b}$ when the point $\vec{p}_0$ moves along the curve are given by the formulas of Frenet-Serret $$\frac{d\vec{t}}{ds} = \kappa \vec{n}$$

$$\frac{d\vec{n}}{ds} = -\kappa \vec{t} + \tau \vec{b}$$

$$\frac{d\vec{b}}{ds} = -\tau \vec{n}.$$

The geometric meaning is that the parameter $\kappa$ and $\tau$ relate to the curvature and torsion of the curve respectively at point $\vec{p}_0$. They are given by the formulas, expressed in natural resp. arbitrary parameterization $$\kappa = \|\vec{\gamma}^{*\prime\prime}(s_0)\| = \frac{\|\vec{\gamma}^{\prime}(t_0) \times \vec{\gamma}^{\prime\prime}(t_0)\|}{\|\vec{\gamma}^{\prime}(t_0)\|^3}$$

$$\tau = \frac{(\vec{\gamma}^{*\prime}(s_0) \times \vec{\gamma}^{*\prime\prime}(s_0)) \cdot \vec{\gamma}^{*\prime\prime\prime}(s_0)}{\kappa^2} = \frac{(\vec{\gamma}^{\prime}(t_0) \times \vec{\gamma}^{\prime\prime}(t_0)) \cdot \vec{\gamma}^{\prime\prime\prime}(t_0)}{\|\vec{\gamma}^{\prime}(t_0) \times \vec{\gamma}^{\prime\prime}(t_0)\|^2}$$

$$= \frac{\begin{vmatrix} \varphi_1^{\prime}(t_0) & \varphi_2^{\prime}(t_0) & \varphi_3^{\prime}(t_0) \\ \varphi_1^{\prime\prime}(t_0) & \varphi_2^{\prime\prime}(t_0) & \varphi_3^{\prime\prime}(t_0) \\ \varphi_1^{\prime\prime\prime}(t_0) & \varphi_2^{\prime\prime\prime}(t_0) & \varphi_3^{\prime\prime\prime}(t_0) \end{vmatrix}}{A^2 + B^2 + C^2}$$

-continued with $$A = \begin{vmatrix} \varphi_1^{\prime}(t_0) & \varphi_1^{\prime\prime}(t_0) \\ \varphi_2^{\prime}(t_0) & \varphi_2^{\prime\prime}(t_0) \end{vmatrix}, B = \begin{vmatrix} \varphi_1^{\prime}(t_0) & \varphi_1^{\prime\prime}(t_0) \\ \varphi_3^{\prime}(t_0) & \varphi_3^{\prime\prime}(t_0) \end{vmatrix}, C = \begin{vmatrix} \varphi_2^{\prime}(t_0) & \varphi_2^{\prime\prime}(t_0) \\ \varphi_3^{\prime}(t_0) & \varphi_3^{\prime\prime}(t_0) \end{vmatrix}$$

Obviously, $\kappa$ is a scalar chosen such that that the magnitude of the normal vector n is unity.

The reciprocal of the curvature is $$\rho = \frac{1}{\kappa},$$

the radius of curvature. The curvature of a straight line is zero, while the curvature of a circle is constant and equal to the reciprocal of the circles' radius.

From the formulas of Frenet-Serret, it can be seen that the curvature is equal to the angular velocity of the tangent vector, and hence is a measure of the rate of change of the tangent vector as the arc length varies. The torsion is equal to the angular velocity of the binormal vector $\vec{b}$, and hence is a measure of the twisting of the curve out of the osculating plane.

Plane (2D) Curvature Computation

For two-dimensional curves, in the plane of the image, the torsion is zero everywhere, and the curvature for a general parameterization reduces to $$\kappa = \frac{|x^{\prime}(t) y^{\prime\prime}(t) - x^{\prime\prime}(t) y^{\prime}(t)|}{(x^{\prime}(t)^2 + y^{\prime}(t)^2)^{3/2}},$$

(for a natural parameterization the denominator is 1). In a digital image, derivatives of a spatially sampled version of the curve are estimated using finite differences.

Note that, although the triple ($\vec{t}$, $\vec{n}$, $\vec{b}$) forms a right-handed coordinate system, and because $\kappa$ is strictly positive, the plane coordinate system ($\vec{t}$, $\vec{n}$) does not inherently imply a right-handed coordinate system.

As stated higher, the topology component of the application cannot be solved without knowing the characteristics of the shape of which the topology is requested. To determine the shape's topology, only pixels of the shape having curvature and torsion characteristics within a specific spatial range may be taken into account. Moreover, the characteristics themselves, which must be fulfilled, must be chosen in relationship to the analyzing scale of the topology. On the one hand, topology of the shape at a too fine scale level may be considered irrelevant, because it is mostly attributable to noise (either intrinsic to the shape, or extrinsic such as image quantization noise). On the other hand, topology of the shape at a too coarse level may also be unwanted, because it may lead to missing the discriminating topological characteristic. It is clear that when the suitable scale is selected, image areas having curvilinear structures that are more curved will contribute more to the determined image orientation.

Fourier-Based Curvature Estimation

Curvature measures may also be computed from a complex contour representation. There are two basic approaches, depending on the specific representation $$u(t) = (x(t), y(t))$$

If $X(f)$ and $Y(f)$ denote the Fourier transform of the contour coordinate signals $x(t)$ and $y(t)$, using the Fourier derivative property that holds on a Fourier transform $F(f)$ of a signal $f(t)$, namely $\dot{F}(f)=j2\pi fF(f)$, $\ddot{F}(f)=-(2\pi f)^2 F(f)$, the plane equation of curvature can be rewritten as $$k(t) = \frac{F^{-1}(fX(f))F^{-1}(f^2Y(f)) - F^{-1}(f^2X(f))F^{-1}(fY(f))}{((F^{-1}(fX(f)))^2 + (F^{-1}(fY(f)))^2)^{3/2}}$$

$$u(t)=x(t)+jy(t)$$

Using the derivatives of $u(t)$, i.e. $\dot{u}(t)=\dot{x}(t)+j\dot{y}(t)$ and $\ddot{u}(t)=\ddot{x}(t)+j\ddot{y}(t)$, the plane equation of curvature can be rewritten as $$k(t) = \frac{-\text{Im}\{\dot{u}(t)\ddot{u}^*(t)\}}{|\dot{u}(t)|^3},$$

wherein the derivatives $\dot{u}(t)$, $\ddot{u}(t)$ are estimated from the inverse of the filtered Fourier transforms of the complex signal $u(t)$.

Because contours are extracted from noisy images, and are spatially sampled, the high-pass filters that implement the derivatives accentuate the influence of high-frequency noise, which could undermine the curvature estimation completely. Applying multi-scale low-pass filters prior to estimating the derivatives can circumvent the noise-enhancing nature of the derivatives. Gaussian filtering, with the standard deviation parameter σ of the time-domain Gaussian is associated with the analyzing scale and controls the degree of contour smoothing (low-pass filtering). However, the Gaussian filtering modifies the signal amplitudes of the filtered contour, implying the so-called shrinking effect. Hence it also affects estimated curvature, since the latter depends on the curve scale. The shrinking effect can be prevented by either renormalizing the contour through the principle of spectral energy conservation, or through the principle of perimeter conservation.

Preferential 2D Image Orientation Based on Normal Vector and Curvature Computation Based on the foregoing differential geometry basics, preferential orientation of an image structure with respect to a given analyzing coordinate system (e.g. one that is aligned with the original image axes, i.e. Cartesian) may now be expressed by drawing the reference coordinate system locally, that is, attached to the point $\vec{p}_0$, and determining the quadrant of the analyzing coordinate system in which the normal $\vec{n}_0$ lies.

Figure 6A:
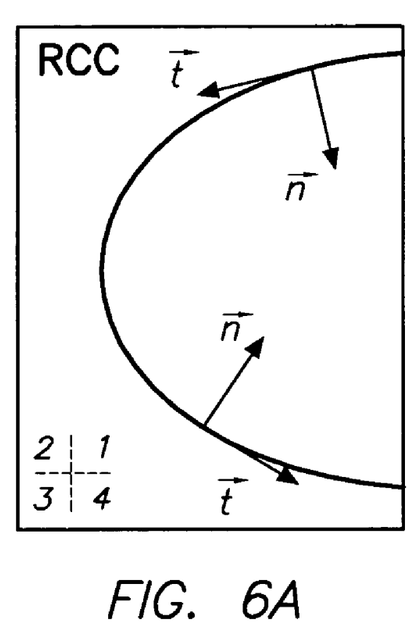
FIGS. 6(a) to (d) illustrate an example of orientation computation for a mammographic image.

For example, assigning quadrants as given in FIG. 6a, a curve, which has everywhere convex shape with respect to the lower image border of the analyzing coordinate system, will have all normal vectors along its path either assigned to quadrant 3 or quadrant 4. Because quadrants 3 and 4 are associated with the negative y values, the overall orientation sense of the shape is determined to be in the direction of the lower image border.

Likewise, all normal vectors of a convex shape with respect to the left image border, will have quadrant assignments 2 and 3. The distribution of quadrant votes are subsequently collected in a histogram, and the quadrant or pair of quadrants with highest votes is taken to assign the principal shape orientation. To weight points with high curvature as more important indicators of the orientation sense of the shape, each vote may be weighted by the value of the curvature, which is an indicator of the orientation's strength.

Figure 4A:
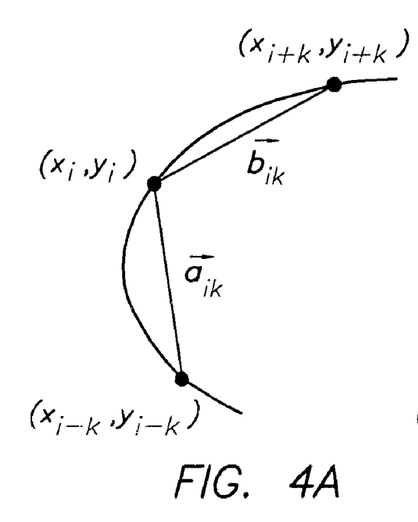
FIGS. 4(a) and (b) illustrate the calculation of the curvature (a) by means of local subtended angle and (b) by means of the magnitude of the addition vector of 2 chord vectors.
Figure 4B:
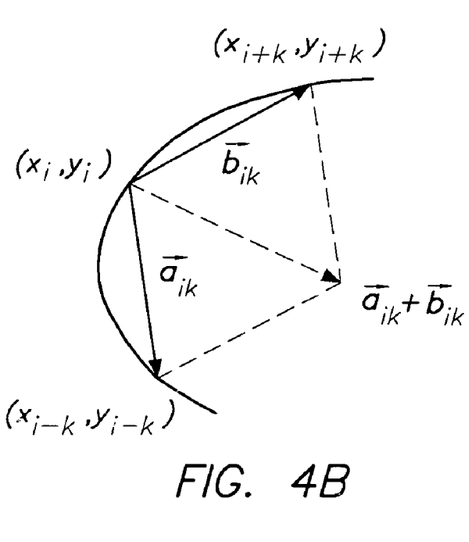

The direction of the center of the osculating circle, which is in the direction of the normal, may be determined by constructing a left and right chord to point $\vec{p}_0$, each with equal arc length distance to point $\vec{p}_0$, and performing the subtraction of these chord vectors (when the chord vectors are drawn both emanating from the point $\vec{p}_0$, the subtraction is performed as an addition). The subtraction vector amounts to a second derivative (the chord length vectors being first derivatives), and when the natural parameterization is used, the subtraction vector points in the direction of the normal vector. This vector operation is depicted in FIG. 4(b).

For a circle, which has constant curvature along the curve, and when a natural parameterisation is used, the chords associated with points at equal arc length distance with respect to $\vec{p}_0$, will have equal length. Therefore, their addition vector points in the direction of the circle's centre, which direction is perpendicular to the tangent vector.

For a straight line, and when a natural parameterisation is used, addition of the chords yields the zero vector, which is plausible because a line has zero curvature everywhere. Either the length of the addition vector, or the angle subtended between the chords may be used as a curvature measure, with larger lengths or smaller angles respectively denoting higher curvature. The direction of the addition vector, corresponding to an associated subtended chords' angle of less than 180 degrees is used to determine the convex side of the curve, or equivalently is used to determine the normal direction, the sense of which is such that when looking towards the vector's end point, the curve is viewed concavely. This subtended angle $\theta_{ik}$ is depicted in FIG. 4(a) and is computed on the basis of the k-vectors (k referring to the arc length distance, expressed as a number of contour pixels, and determining the analyzing scale)

$$\vec{a}_{ik}=(\dot{x}_i-x_{i+k}, y_i-y_{i+k})$$

$$\vec{b}_{ik}=(x_i-x_{i-k}, y_i-y_{i-k})$$

$$\theta_{ik} = \arccos\left(\frac{\vec{a}_{ik}\cdot\vec{b}_{ik}}{|\vec{a}_{ik}|\cdot|\vec{b}_{ik}|}\right)$$

$\cos(\theta_{ik})$ will be 1 for the angle at a cusp (corresponding to infinite curvature), 0 for a 90-degree angle and −1 along a straight line.

As stated before, in digital images, special attention has to be paid to the scale at which the derivatives in the curvature formula are evaluated. This scale may be controlled by the choice of the arc length differences defining the chord vectors. Care must be exercised in selecting the right analyzing scale. Obviously, when the arc length distance between the analyzing points is too small, curvature due to noisy variations of the curve is measured. Conversely, when the distance is too large, curvature-based shape features may still have poor discriminatory power. The differentiation acts as a high-pass filter that accentuates the influence of high frequency noise, which can undermine the curvature estimation. Applying larger inter-pixel arc length distances in the evaluation of the differences has a similar effect as applying a low-pass filter in the derivatives estimation step, and will yield more stable curvature estimates.

Preferential 3D Space Curve Orientation

Similarly to using curvature by assigning the normal vector to a local quadrant of a local analyzing 2D coordinate system for assessing the shape orientation of a curve in 2D, normal and binormal may be used to assign them to octants of a local analyzing 3D coordinate system, for assessing the shape orientation of a 3D curve or surface. For example, at each point $\vec{p}_0$ of a 3D space curve, a normal plane is constructed at $\vec{p}_0$, formed by the normal vector $\vec{n}_0$ and binormal vector $\vec{b}_0$. The addition vector $\vec{n}_0 + \vec{b}_0$ lies in the normal plane and its orientation sense may be quantized into one of the eight analyzing Cartesian space quadrants. Analogous to the 2D case, the weighting may be generalized by multiplying the vote with a scalar depending on the local curvature and torsion at $\vec{p}_0$.

Application of Image Orientation Detection

1. Thorax Orientation Detection

Curvature of ribs or the ribcage may be used to infer the orientation and reflection of the thoracic X-ray image. The curvature is calculated for all edge segments resulting from an edge-based segmentation and the preferential direction (top-down, right-left, left-right or down-top) may be inferred on the basis of a voting scheme of analyzing coordinate system quadrant assignments. Edge segments associated with direct exposure contours will typically have less influence because their number is much smaller than edge segments belonging to ribs. Alternatively, they may be discarded based on their classification as being a diagnostic/direct exposure contour.

Figure 5:
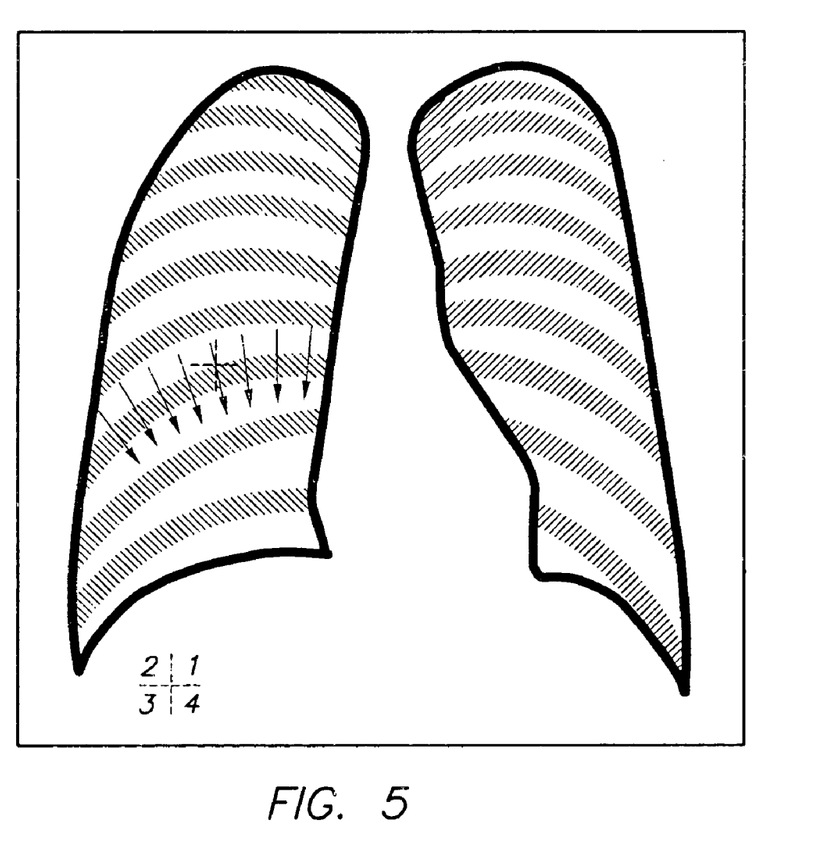
FIG. 5 is an example of orientation computation for thorax examination.

According to FIG. 5, the algorithm for detection of the orientation in one of four classes (upright, upside-down, right-to-left with upper part of the thorax at the right side, left to right with upper part of the thorax at the left side) is as follows:

Step 1: segmentation of the lung fields using techniques of the prior art such as thresholding or region-growing (region-based methods), or active shape models (contour-based methods). Only image data pertaining to the lung fields may be used in further process steps.

Step 2: edge detection using techniques of the prior art such as the Sobel operator, and thinning of edges by non-maximum suppression to yield one-pixel thick edges.

Step 3: edge-following to group touching edge pixels into edge segments.

Step 4: curvature and normal computation at each edge point along the edge segment according to the principles and technique outlined before.

Step 5: quantizing the normal direction. This operation is equivalent to coordinate quadrant voting when there are 4 angular intervals corresponding to partitioning of the image plane using axes parallel with the coordinate axes. In the example of FIG. 5, the normals pointing towards the center of the osculating circle, mostly point in the direction of quadrant 4, edge pixels nearer to the mediastinum have their normals pointing towards quadrant 3. Similar voting result holds true for the other ribs in this lung area; the reverse holds true for the associated ribs in the contralateral lung area. Quadrant voting is plausible when a topology modification is considered that will change the orientation of the image by a multiple of 90 degrees with respect to the axes of the current image coordinate system.

Step 6: grouping of angular interval entries to cover the desired image orientations. For thorax examinations, which normally are taken in the upright position (such that the thorax symmetry line is a vertical, and the upper thorax part is at the top of the image), the group sums of quadrant pairs 1+2, 2+3, 3+4, 4+1 are considered. Because quadrants 3 and 4 are below the x-axis, and are both touching to the lower image border (when the coordinate axes are drawn in the center of the image), the group sum 3+4 is associated with the upright thorax position. The group votes according to quadrants 1+2 are associated with the upside-down thorax position; similarly, group votes of quadrants 2+3 and 4+1 are associated with the right-to-left resp. left-to-right thorax position.

Step 7: selecting the image orientation according to the maximal group vote. According to FIG. 5 the image is in the upright position when the group sum of quadrant 3 and 4 votes is maximal among the sum 1–2, 2–3, 3–4, 4–1.

The orientation of a frontal and a lateral skull contour may also be inferred based on the cumulative direction of normal vectors. Because of the symmetrical shape of the skull contour, addition of all normal vectors belonging to the diagnostic/direct exposure contour, will have canceling components in the perpendicular direction, however, in the direction corresponding to the skull symmetry line, they will have a cumulative additive effect.

This principle may also be used to detect 3D preferential orientation of spherical shapes in 3D voxel data, such as occurring frequently in CT or MR cerebral examinations.

Curvature and torsion are interesting descriptors for 3D space curves such as catheters, and the curve corresponding to the spinal center.

Curvature and torsion may be used to characterize spinal 3D shape and to infer reflection of a lateral thorax view. A lateral view of the spinal chord has positive curvature for its thoracic part (the medical nomenclature of this curvature being kyphosis), and has negative curvature for its lumbar part (the medical nomenclature of this curvature being lordosis). Hence lateral views of the spine may be displayed or printed such that it has the standard or preferred orientation.

From the foregoing, it will be clear that the disclosed algorithm to detect the orientation of thorax examinations is insensitive to the presence of collimation areas, for it uses edges as the main detected image feature. The influence of collimation borders is minimized for two basic reasons. First, the number of edge pixels due to collimation borders is typically much less than the number of edge pixels due to edges. Hence their contribution in the voting is smaller. Secondly, the collimation borders are typically straight lines, meaning that their curvature is near to zero. Hence the weight attached to them is also very small. Hence, it is an advantage of the present invention that collimation need not be removed necessarily for correctly determining orientation. This feature is particularly advantageous in pediatric radiology, where the border may cover more than 30% of the image area.

A second characteristic of the disclosed method is that it relies on image features which are very typical of a thorax image i.e. it relies on the shape of ribs, which are almost always present on a thorax, even when the contrast of some may partially be diminished due to hyper-dense lung tissue.

The algorithm further handles four types of thorax images: adult posterio-anterior (PA) and antero-posterior (AP), and pediatric PA and AP projections. Although all of them are thorax images, their range of appearance differs significantly. Particularly pediatric images are most different from the standard adult thorax image. In the latter, the mediastinum is usually centered within the image, and the image itself contains only the thorax. In pediatric thorax acquisitions, the image may or may not include the head or part of it, the location of the arms is random, and part of the abdomen may sometimes be included and the area of exposed sub-diaphragm may differ. For these regions are relative free of the presence of structured edges, they will contribute negligibly to the voting measure. The algorithm is further robust against non-centered image and the presence of a centerline that may have a random angle with respect to the vertical axis of the image. Because the ribs are circular 3D structures spanning between the sternum and the spine, the curvature measure is also relative invariant to angular deviations of the centerline.

2. Mammographic Orientation Detection

Curvature of the mammographic skin line may be used to infer the orientation and reflection of the mammographic X-ray image. The curvature is calculated for all skin border edge segments resulting from an edge-based segmentation and, similarly to the thorax orientation detection, the preferential direction (top-down, right-left, left-right or down-top) may be inferred on the basis of a voting scheme of analyzing coordinate system quadrant assignments. The skin line edge can be determined by selecting and chaining the pixels on the region transition obtained by a segmentation such as disclosed in European patent application 887 769.

According to FIG. 6a, the algorithm for detection of the orientation of a mammographic CC (craniocaudal) view into one of four classes (corresponding to whether the chest wall is aligned with the left, right, upper or lower image border) is as follows:

Step 1: segmentation of the skin line of the mammographic breast mass using techniques of the prior art such as thresholding or region-growing of the direct exposure area.

Step 2: edge detection to determine the one-pixel thick edges of the skin line (transition between breast mass and direct exposure area).

Step 3: edge-following to group touching edge pixels into edge segments.

Step 4: curvature and normal computation at each edge point along the edge segment according to the principles and technique outlined before.

Step 5: quantizing the normal direction. This operation is equivalent to coordinate quadrant voting when there are 4 angular intervals corresponding to partitioning of the image plane using axes parallel with the coordinate axes.

Step 6: grouping of angular interval entries to cover the desired image orientations.

Figure 6B:
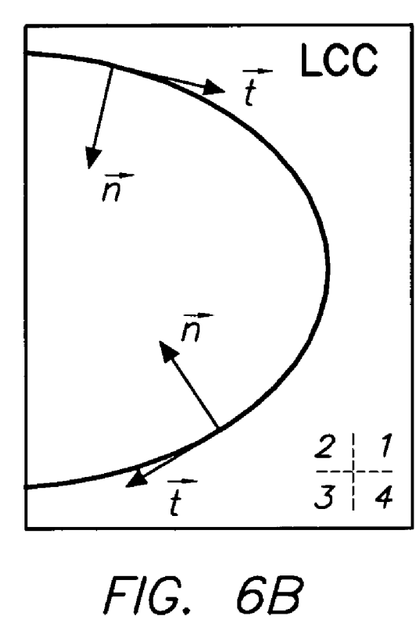
Figure 6C:
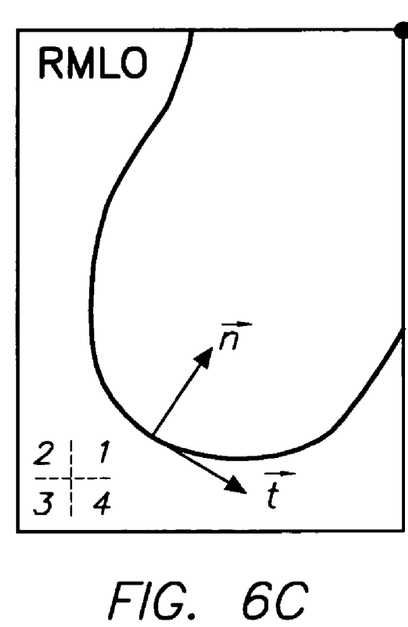
Figure 6D:
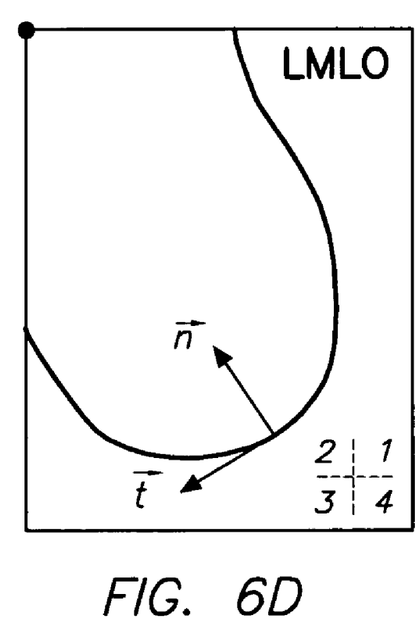

Step 7: selecting the image orientation according to the maximal group vote. In the example of FIG. 6a, the normals around the breast nipple of the RCC view given mostly point in the direction of quadrant 1 and 4 (representing the right image border). For the LCC view given (FIG. 6b), the normals around the breast nipple point in the direction of quadrant 2 and 3 (representing the left image border). For the RMLO and LMLO view given (FIGS. 6c, 6d), these normals point towards quadrant 1 (representing the top-right corner) and quadrant 2 (representing the top-left corner) respectively.

Variations of the outlined algorithm can be envisaged without departing from the scope of the present invention. For example, instead of computing the normal for all edge pixels and applying a voting mechanism, a single circle can be fit to the edge data and the direction of the midpoint of the fitted circle segment towards the circle center can be used as the main object orientation. This circle resembles a least squares approximating osculating circle of maximal curvature.

Region-Based Shape Orientation Measures

The former methods actually require that a curve be extracted from the image data, for example by edge detection. However, in the absence of a well defined boundary of a curved object, the curvature of the overall shape of the object can also be computed by using iso-intensity lines embedded in the object. Hence, the voting strategy outlined before, may now be applied to the group of pixels inside the object using the local quantized curvatures of the available or selected object pixels.

Region Representation

In its simplest form, a region may be viewed as a grouping or collection of pixels belonging to an entity having a problem-specific semantic (e.g. all pixels belonging to an object part). At a higher level of abstraction, a region may be described by its decomposition in smaller primitive forms (such as polygons, or quadtrees). A region may also be described by its bounding region such as the Feret box, the minimum enclosing rectangle or the convex hull. Finally, a region may be represented by its internal features such as its skeleton, or a run-length representation.

Iso-Intensity Curvature Measure

An iso-intensity line is a curve of constant intensity, sometimes called an isophote. The geometric properties at a point (x,y) can be described by approximating the gray value function $f(x,y)$ by its Taylor series $$f(x+\Delta x, y+\Delta y) \cong f(x,y) + \begin{bmatrix} \Delta x \\ \Delta y \end{bmatrix}^T \nabla f(x,y) + \frac{1}{2}\begin{bmatrix} \Delta x \\ \Delta y \end{bmatrix}^T H_f(x,y) \begin{bmatrix} \Delta x \\ \Delta y \end{bmatrix}$$

Defining the gradient of the gray value function $f(x,y)$ as $$\nabla f(x,y) = \begin{bmatrix} f_x(x,y) \\ f_y(x,y) \end{bmatrix} = \begin{bmatrix} f_x \\ f_y \end{bmatrix}$$

the first derivative can be computed in any direction $\vec{v}$ as $f_v = \vec{v} \cdot \nabla f$.

The partial derivatives in the foregoing and following expressions are computed by convolving the original intensity image with directional derivatives of a Gaussian at a certain scale represented by the standard deviation $\sigma$ of the Gaussian, that is based on the equality $$\frac{\partial}{\partial x}(f(x,y) \otimes G(x,y,\sigma)) \equiv f(x,y) \otimes \left(\frac{\partial}{\partial x} G(x,y,\sigma)\right)$$

The spatial extent of the Gaussian has a smoothing effect, and is advantageous to ignore curved structures that are attributable to noise or irrelevant image detail such as local trabecular bone structure.

The normal to the isophote in a pixel is the gradient direction, which direction is tangent to the flowline through that pixel. The tangent to the isophote curve is the gradient perpendicular. The unity normalized vectors corresponding to these directions are given by $\vec{w} = \vec{n} = \nabla f / \|\nabla f\|$, $\vec{v} = \vec{t} = \vec{n}_\perp$. The orientation or sense of the normal $\vec{n}$ is chosen such that the vector points in the direction where the projection of the isophote curve on the tangent line is concave. This orientation choice is independent of the traversal direction of the curve.

By taking the second-order term in the local Taylor approximation at a point (x,y) into account, second-order geometric properties can be computed of the local image gray value surface. The second-order term is described by the symmetric Hessian $H_f(x,y)$ $$H_f(x, y) = \begin{bmatrix} f_{xx}(x, y) & f_{xy}(x, y) \\ f_{xy}(x, y) & f_{yy}(x, y) \end{bmatrix}.$$

This matrix can be used to compute the second derivatives in other directions, such as the local gradient $\overline{w}$, tangent $\overline{v}$ coordinate axes, as follows $$f_{vw} = \overline{v}^T H \overline{w}, f_{vv} = \overline{v}^T H \overline{v}, f_{ww} = \overline{w}^T H \overline{w}$$

These second-order derivatives are the constituent elements of the Hessian matrix in the vw coordinate system, obtained by applying the rotation matrix R to the xy coordinates, $$\begin{bmatrix} v \\ w \end{bmatrix} = \frac{1}{\sqrt{f_x^2 + f_y^2}} \begin{bmatrix} f_y & -f_x \\ f_x & f_y \end{bmatrix} \begin{bmatrix} x \\ y \end{bmatrix} = R \begin{bmatrix} x \\ y \end{bmatrix}$$

$$RH_f R^T = \begin{bmatrix} f_{vv} & f_{vw} \\ f_{vw} & f_{ww} \end{bmatrix}$$

$$= \frac{1}{f_x^2 + f_y^2} \begin{bmatrix} f_x^2 f_{yy} - 2f_x f_y f_{xy} + f_y^2 f_{xx} & (f_y^2 - f_x^2) + f_x f_y (f_{xx} - f_{yy}) \\ (f_y^2 - f_x^2) + f_x f_y (f_{xx} - f_{yy}) & f_x^2 f_{xx} + 2f_x f_y f_{xy} + f_y^2 f_{yy} \end{bmatrix}$$

The Hessian is real and symmetric and has the properties that its determinant is equal to the product of its eigenvalues, and is invariant to the selection of the original axes x and y.

For $\overline{v}$ points in the isophote contour direction, the second derivative in the contour direction SDCD is given by $$f_{vv} = \frac{f_x^2 f_{yy} - 2f_x f_y f_{xy} + f_y^2 f_{xx}}{f_x^2 + f_y^2}.$$

The second derivative in the isophote contour direction $\overline{v} = (f_y, -f_x)$ is related to the isophote curvature defined as the change in orientation of the tangent angle as one moves along the isophote path $$\kappa = \frac{d\theta}{ds} = \left( \cos\theta \frac{\partial}{\partial x} + \sin\theta \frac{\partial}{\partial y} \right) \arctan\left( -\frac{f_y}{f_x} \right)$$

$$= -\frac{(f_x^2 f_{yy} - 2f_x f_y f_{xy} + f_y^2 f_{xx})}{(f_x^2 + f_y^2)^{3/2}} = -\frac{SDCD}{\sqrt{f_x^2 + f_y^2}}$$

where $\sqrt{f_x^2 + f_y^2}$ is the gradient magnitude.

Similar to the voting procedure outlined in the curve-based orientation detection method, the orientation direction of a curved grey value structure is computed by a weighted voting of quantized local orientations of the directions corresponding to the normal vector. The weight attached to the vote is proportional to the value of the isophote curvature $\kappa$, meaning that image areas having iso-intensity lines that are more curved will contribute more to the determined image orientation.

This method is extended to determine the main orientation of a 3D iso-grey surface patch in a 3D image. At each point (x,y,z) the principal curvatures $\kappa_1, \kappa_2$ ($\kappa_1 > \kappa_2$) and their corresponding surface vectors $\vec{c}_1$ and $\vec{c}_2$ lying in the plane tangent to the iso-grey surface are computed as follows. First, the gradient vector $\vec{g} = (f_x, f_y, f_z)$ is calculated, which vector is aligned with the surface normal vector, and the Hessian matrix $$H = \begin{bmatrix} f_{xx} & f_{xy} & f_{xz} \\ f_{xy} & f_{yy} & f_{yz} \\ f_{xz} & f_{yz} & f_{zz} \end{bmatrix},$$

with derivatives evaluated by convolving the image with derivates of Gaussian kernels. Next, the Hessian is rotated to align the first axis with the gradient. The resulting matrix has the form $$H' = \begin{bmatrix} f_{gg} & 0 & 0 \\ 0 & f_{uu} & f_{uv} \\ 0 & f_{uv} & f_{vv} \end{bmatrix} = \begin{bmatrix} f_{gg} & 0 \\ 0 & H'_T \end{bmatrix}$$

with $f_{gg}$ the second derivative in the gradient direction and $H'_T$ a 2D Hessian in the touching plane perpendicular to the gradient. Finally, the eigenvalues and eigenvectors of the Hessian $H'_T$ are used to describe second-order geometry of the local gray value surface of the 3D image. The first eigenvector $\vec{c}_1$ corresponding to the largest absolute eigenvalue $\lambda$ is the direction of the greatest curvature (second derivative). The second eigenvector $\vec{c}_2$, whose corresponding eigenvalue $\lambda_2$ has the smallest absolute value, is the direction of least curvature. These eigenvectors lie in the touching plane perpendicular to the gradient. The corresponding eigenvalues are the respective amounts of these curvatures, denoted by $\kappa_1$, $\kappa_2$ respectively, and referred to as principal curvatures. They are invariant under rotation of the original coordinate system. The eigenvectors are called principal directions p,q and are perpendicular to each other. They are directions of pure curvature for their mixed partial derivatives are zero. For curvature is defined along a line, the curvatures $\kappa_1, \kappa_2$ of the intersection curves $C_1$ and $C_2$ of the surface patch with the planes ($\vec{c}_1, \vec{g}$) and ($\vec{c}_2, \vec{g}$) respectively are related as in 2D with the second derivatives in contour direction.

$$\kappa_1 = -\frac{\lambda_1}{\|\vec{g}\|} = -\frac{SDC_1D}{\|\vec{g}\|}$$

$$\kappa_2 = -\frac{\lambda_2}{\|\vec{g}\|} = -\frac{SDC_2D}{\|\vec{g}\|}$$

The quantity represented by the determinant of the Hessian $H'_T$ is called the Gaussian curvature. The trace of the Hessian (which is the sum of the diagonal elements) is also invariant to the selection of x and y. Half the trace is equal to the mean of the principal curvatures $\kappa_1, \kappa_2$, and are invariant to the selection of x and y.

Similar to the voting procedure outlined in the curve-based orientation detection method, the orientation direction of a curved 3D grey value structure is computed by a principal curvature-weighted voting of quantized local orientations vectors. For curvature is defined along a line, the curvature value used at the vote weight is a combination of the principal curvatures. Suitable combinations, rewritten in term of derivatives with respect to the principal directions p and q are the Gaussian curvature $K=\kappa_1\kappa_2=L_{pp}L_{qq}$ (which geometrically represents the extra amount of area enclosed by the perimeter of the curved surface patch w.r.t. the area of a flat patch), the mean curvature $H=(L_{pp}+L_{qq})/2$, or the Laplacian $L=L_{pp}+L_{qq}=2H$. They are invariant under rotation of the coordinate system.

What is claimed is:

1. A computer implemented method of determining the orientation of an image comprising:
   determining, via a computer for processing a digital representation of said image, the orientation from direction and magnitude of normal vectors associated with local curvature in a set of points associated with the digital representation of said image by:
      performing a first and second derivative vector computation for one or more pixels of said digital representation;
      quantizing a direction and magnitude of the computed first and second derivative vectors;
      weighted voting the quantized first and second derivative directions into analyzing coordinate system orientations to determine a maximum vote; and
      selecting the image orientation having the maximum vote.

2. The method according to claim 1 wherein said image is represented by a digital edge representation.

3. The method according to claim 1 wherein said image is a thoracic image, the method further comprising determining curvature of at least one of ribs and ribcage in said thoracic image.

4. The method according to claim 1 wherein said image is a mammographic image and wherein a curvature is calculated for skin border edge segments of said image.

5. The method according to claim 1 wherein collimation areas are excluded from said digital representation.

6. The method according to claim 1 wherein direct exposure areas are excluded from said digital representation.

7. The method according to claim 1 further comprising orienting the image represented by the digital representation into a desired orientation by subjecting said image to an orientation modifying geometric transformation to yield said desired orientation of the image.

8. A computer readable medium having stored thereon computer executable program code for carrying out the steps of claim 1.

9. The method according to claim 1 wherein said orientation is deduced from an addition vector of said normal vectors.

10. The method according to claim 1 wherein said image is represented by an iso-intensity representation.

11. The method according to claim 1 wherein said direction and magnitude of the computed first and second derivative vectors are quantized according to four Cartesian plane quadrants.

12. The method according to claim 1 wherein said direction and magnitude of the computed first and second derivative vectors are quantized according to eight Cartesian space octants.

* * * * *